United States Patent
Ito et al.

(10) Patent No.: US 9,840,360 B2
(45) Date of Patent: *Dec. 12, 2017

(54) OXYGEN ABSORBENT COMPOSITION

(71) Applicant: MITSUBISHI GAS CHEMICAL COMPANY, INC., Tokyo (JP)

(72) Inventors: Fumihiro Ito, Kanagawa (JP); Satoshi Okada, Kanagawa (JP); Shinpei Iwamoto, Kanagawa (JP); Shinichi Ikeda, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/770,943

(22) PCT Filed: Mar. 5, 2014

(86) PCT No.: PCT/JP2014/055552
§ 371 (c)(1),
(2) Date: Aug. 27, 2015

(87) PCT Pub. No.: WO2014/136812
PCT Pub. Date: Sep. 12, 2014

(65) Prior Publication Data
US 2016/0031628 A1    Feb. 4, 2016

(30) Foreign Application Priority Data

Mar. 6, 2013 (JP) .................................. 2013-044236

(51) Int. Cl.
| | |
|---|---|
| *B01J 20/26* | (2006.01) |
| *B65D 81/26* | (2006.01) |
| *C08G 63/181* | (2006.01) |
| *B01D 53/02* | (2006.01) |
| *B01J 20/02* | (2006.01) |
| *B01J 20/28* | (2006.01) |
| *C08G 63/187* | (2006.01) |

(52) U.S. Cl.
CPC ........... *B65D 81/266* (2013.01); *B01D 53/02* (2013.01); *B01J 20/0203* (2013.01); *B01J 20/0225* (2013.01); *B01J 20/262* (2013.01); *B01J 20/2805* (2013.01); *C08G 63/181* (2013.01); *B01D 2253/1122* (2013.01); *B01D 2253/202* (2013.01); *B01D 2253/25* (2013.01); *B01D 2257/104* (2013.01)

(58) Field of Classification Search
CPC ...... B01D 2253/1122; B01D 2253/202; B01D 2253/25; B01D 2257/104; B01D 53/02; B01J 20/262; C08G 63/181; C08G 63/187

See application file for complete search history.

(56) References Cited

U.S. PATENT DOCUMENTS

| | | | |
|---|---|---|---|
| 3,049,506 A | 8/1962 | Kibler et al. | |
| 3,505,282 A * | 4/1970 | Storms et al. | ....... C08G 63/181 528/180 |
| 5,529,833 A | 6/1996 | Speer et al. | |
| 6,063,503 A | 5/2000 | Hatakeyama et al. | |
| 2003/0068455 A1 | 4/2003 | Oguro et al. | |
| 2010/0106096 A1 | 4/2010 | Hirokane et al. | |
| 2012/0001121 A1 | 1/2012 | Ishizaki et al. | |

FOREIGN PATENT DOCUMENTS

| | | |
|---|---|---|
| CN | 1396208 | 2/2003 |
| CN | 102414246 | 4/2012 |
| EP | 2 404 948 | 1/2012 |
| EP | 2 907 848 | 8/2015 |
| JP | 5-115776 | 5/1993 |
| JP | 7-165776 | 6/1995 |
| JP | 9-234832 | 9/1997 |
| JP | 2001-252560 | 9/2001 |
| JP | 2003-521552 | 7/2003 |
| JP | 2004-131118 | 4/2004 |
| JP | 2007-320576 | 12/2007 |
| JP | 2009-6204 | 1/2009 |
| JP | 2009-006204 | 1/2009 |
| WO | 99/48963 | 9/1999 |
| WO | 2013/031877 | 3/2013 |
| WO | 2013/077436 | 5/2013 |
| WO | 2014/034800 | 3/2014 |

OTHER PUBLICATIONS

George Odian "Principles of Polymerization" Chapter II, pp. 39-197, Fourth Edition.2004.*
International Search Report in Patent Application No. PCT/JP2014/055552, dated May 27, 2014.
English translation of the Written Opinion for Patent Application No. PCT/JP2014/055552, which was dated May 27, 2014.

* cited by examiner

*Primary Examiner* — Ling Choi
*Assistant Examiner* — Gennadiy Mesh
(74) *Attorney, Agent, or Firm* — Greenblum & Bernstein, P.L.C.

(57) ABSTRACT

An oxygen absorbent composition which comprises a polyester oligomer containing a constitutional unit derived from a tetralin ring-containing carboxylic acid and a diol, wherein the polyester oligomer has a number average molecular weight of 500 to 10000, and a transition metal catalyst comprising at least one transition metal selected from the group consisting of manganese, iron, cobalt, nickel and copper.

4 Claims, No Drawings

OXYGEN ABSORBENT COMPOSITION

TECHNICAL FIELD

The present invention relates to an oxygen absorbent composition, and particularly to an oxygen absorbent composition at least containing a polyester oligomer having a tetralin ring and a transition metal catalyst.

BACKGROUND ART

Examples of articles which easily deteriorate or degrade under the effect of oxygen include foods, beverages, medicinal products and cosmetics. For the purpose of preventing oxidation of such articles with oxygen, thereby storing them for a long term, oxygen absorbents, which remove oxygen within packaging bodies storing these articles, are used.

As the oxygen absorbent, an oxygen absorbent containing an iron powder as a reactive base compound (hereinafter, referred to also as "iron-based oxygen absorbent") is generally used in view of oxygen-absorbing ability, handling and safety. However, the iron-based oxygen absorbent is responsive to a metal detector and thus it is difficult to inspect packaging bodies containing the iron-based oxygen absorbent for a foreign matter by using a metal detector. Furthermore, packaging bodies containing an iron-based oxygen absorbent have a risk of ignition, and thus, they cannot be heated by a microwave oven. Moreover, the oxidation reaction of an iron powder requires water, and thus, an oxygen-absorbing effect is exerted only when a preserve is rich in moisture content.

Packaging containers are developed by making the container of a multilayered material having an oxygen-absorbing layer formed of an oxygen-absorbing resin composition containing a thermoplastic resin and an iron-based oxygen absorbent, thereby improving a gas barrier property of the container and providing an oxygen-absorbing function to the container itself (see, for example, Patent Document 1). However, this container have the same problems: since an iron-based oxygen absorbent is responsive to a metal detector, a foreign matter cannot be inspected by using a metal detector; a microwave oven cannot be used for heating and an effect is only exerted in a preserve having a high moisture content. In addition, the container is opaque. Due to this, the container has a problem in that visibility of content is insufficient.

In the aforementioned circumstances, it has been desired to develop an oxygen absorbent containing an organic substance as a reactive base compound. As the oxygen absorbent containing an organic substance as a reactive base compound, an oxygen absorbent containing ascorbic acid as a base compound is known (see, for example, Patent Document 2).

In the meantime, an oxygen-absorbing resin composition, which is composed of a resin and a transition metal catalyst, having an oxygen trapping property is known. For example, a resin composition composed of a polyamide, in particular, a xylylene group-containing polyamide, serving as an oxidizing organic component, and a transition metal catalyst, is known (see, for example, Patent Document 3). In Patent Document 3, articles obtained by molding such a resin composition, such as an oxygen absorbent, a packaging material and a multilayer laminated film for packaging are further exemplified.

As an oxygen-absorbing resin composition requiring no moisture content for absorbing oxygen, an oxygen-absorbing resin composition composed of a resin having a carbon-carbon unsaturated bond and a transition metal catalyst, is known (see, for example, Patent Document 4).

As a composition for trapping oxygen, a composition composed of a polymer containing a substituted cyclohexene ring or a low molecular-weight substance bound with the cyclohexene ring and a transition metal is known (see, for example, Patent Document 5).

LIST OF PRIOR ART DOCUMENTS

Patent Documents

Patent Document 1: Japanese Patent Laid-Open No. 9-234832
Patent Document 2: Japanese Patent Laid-Open No. 51-136845
Patent Document 3: Japanese Patent Laid-Open No. 2001-252560
Patent Document 4: Japanese Patent Laid-Open No. 5-115776
Patent Document 5: National Publication of International Patent Application No. 2003-521552

SUMMARY OF INVENTION

Problems to be Solved by Invention

However, the oxygen absorbent described in Patent Document 2 has problems in that the oxygen-absorbing performance is primarily low; an effect is exerted only when a preserve is rich in moisture content; and the cost is relatively high.

The resin composition described in Patent Document 3 has the following problem. Since an oxygen-absorbing function is exerted by oxidizing a xylylene group-containing polyamide resin in the presence of a transition metal catalyst, the polymer chain of the resin is cut by oxidation degradation after absorption of oxygen, with the result that the strength of the packaging container itself decreases. In addition, the oxygen-absorbing performance of the resin composition described therein is still insufficient and the effect is exerted only when a preserve is rich in moisture content.

The oxygen-absorbing resin composition described in Patent Document 4 has the same problem as mentioned above, that is, the polymer chain of the resin is cut by oxidation to produce low molecular-weight organic compounds serving as odor-producing components, with the result that odor is produced after absorption of oxygen.

In the composition described in Patent Document 5, a special material containing a cyclohexene ring must be used. This material still has a problem in relatively easily producing odor.

The present invention was made in consideration of the problems mentioned above. An object of the invention is to provide a novel oxygen absorbent composition, being suppressed in odor generation after absorption of oxygen and having excellent oxygen-absorbing performance. Another object of the present invention is to provide an oxygen absorbent composition having excellent oxygen-absorbing performance in a wide range of humidity conditions from low humidity to high humidity.

Means for Solving Problems

The present inventors conducted intensive studies on an oxygen absorbent composition. As a result, they found that the aforementioned problems are solved by using a polyester oligomer having a predetermined tetralin ring together with a transition metal catalyst, and accomplished the present invention.

More specifically, the present invention is as follows.

<1> An oxygen absorbent composition at least containing:

a polyester oligomer containing a constitutional unit having at least one tetralin ring selected from the group consisting of constitutional units represented by the following formulas (1) to (4),

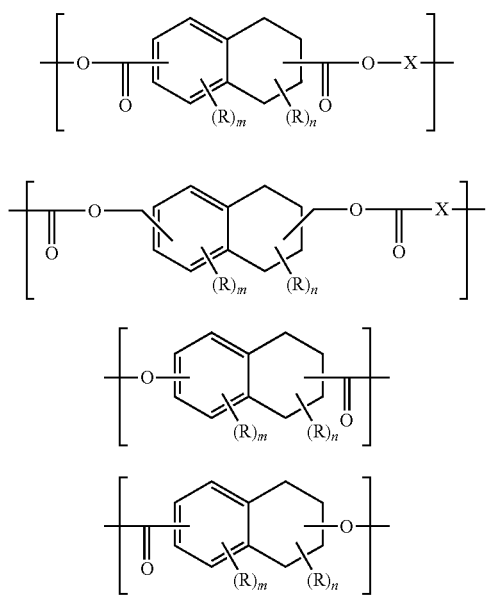

where R each independently represent a monovalent substituent, which is at least one selected from the group consisting of a halogen atom, an alkyl group, an alkenyl group, an alkynyl group, an aryl group, a heterocycle group, a cyano group, a hydroxy group, a carboxyl group, an ester group, an amido group, a nitro group, an alkoxy group, an aryloxy group, an acyl group, an amino group, a mercapto group, an alkylthio group, an arylthio group, a heterocyclic thio group and an imide group, and which may further has a substituent; where m each independently represent an integer of 0 to 3; where n each independently represent an integer of 0 to 6, at least one hydrogen atom is bound to the benzyl position of the tetralin ring; and where X each independently represent a divalent group containing at least one group selected from the group consisting of an aromatic hydrocarbon group, a saturated or unsaturated alicyclic hydrocarbon group, a straight or branched and saturated or unsaturated aliphatic hydrocarbon group and a heterocycle group; and a transition metal catalyst.

<2> The oxygen absorbent composition according to the above <1>, wherein the polyester oligomer is a polyester oligomer obtained by reacting a terminal stopping agent containing a monovalent aliphatic alcohol or an aliphatic organic acid.

<3> The oxygen absorbent composition according to the above <1> or <2>, wherein the polyester oligomer has a number average molecular weight of 500 to 10000.

<4> The oxygen absorbent composition according to any of the above <1> to <3>, wherein the transition metal catalyst is a catalyst containing at least one transition metal selected from the group consisting of manganese, iron, cobalt, nickel and copper.

<5> The oxygen absorbent composition according to any of the above <1> to <4>, wherein the transition metal catalyst is contained in an amount of 0.001 to 10 parts by mass in terms of a transition metal based on 100 parts by mass of the polyester oligomer.

<6> The oxygen absorbent composition according to any of the above <1> to <5>, wherein the constitutional unit represented by the general formula (1) is at least one selected from the group consisting of the constitutional units represented by the following formulas (5) to (7):

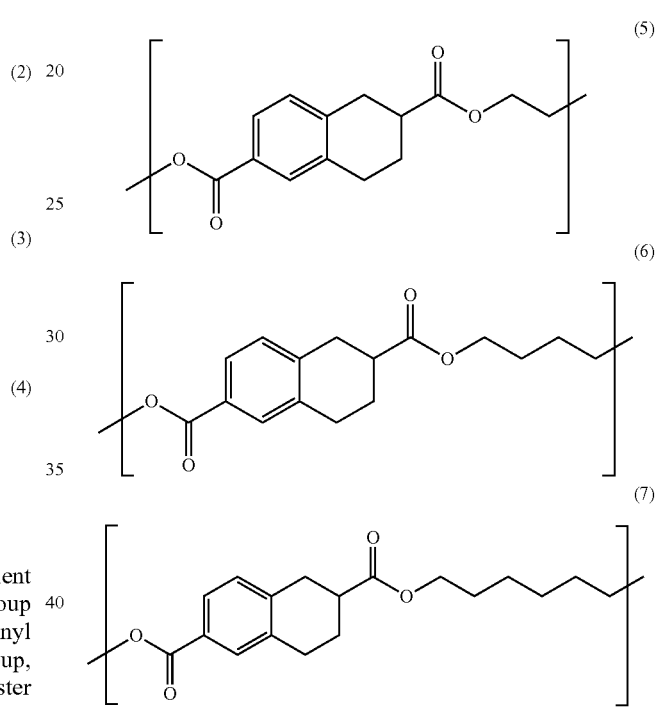

<7> The oxygen absorbent composition according to any of the above <1> to <6>, further containing a thermoplastic resin.

<8> A molded article containing the oxygen absorbent composition according to the above <7>.

Advantages of Invention

According to the present invention, it is possible to provide an oxygen absorbent composition having excellent oxygen-absorbing performance in a wide range of humidity conditions from low humidity to high humidity. Since the oxygen absorbent composition can absorb oxygen regardless of the presence or absence of the moisture content of a preserve and odor generation is suppressed after absorption of oxygen, can be applied to a wide variety of uses including foods, cooking foods, beverages, medicinal products and health foods, no matter what products they are. Furthermore, according to a preferable form of the invention that does not contain an iron powder etc., it is also possible to provide an oxygen absorbent composition not responsive to a metal detector.

MODE FOR CARRYING OUT INVENTION

Hereinafter, an embodiment of the present invention (hereinafter, also described as "the present embodiment") will be described in detail. The following embodiment is illustrative in order to describe the present invention. The present invention is not limited only to the present embodiment.

[Oxygen Absorbent Composition]

The oxygen absorbent composition of the present embodiment at least contains a polyester oligomer (hereinafter, simply referred also to a "tetralin ring-containing polyester oligomer") containing at least one constitutional unit having a tetralin ring selected from the group consisting of constitutional units represented by the above general formulas (1) to (4) and a transition metal catalyst.

<Tetralin Ring-Containing Polyester Oligomer>

The tetralin ring-containing polyester oligomer to be used in the oxygen absorbent composition of the present embodiment contains at least one of the constitutional units represented by the above general formulas (1) to (4). It is preferable that the constitutional unit represented by the above general formula (1) is at least one selected from the group consisting of constitutional units represented by the above formulas (5) to (7). Owing to such a constitutional unit, raw material cost tends to be successfully reduced. The phrase of "contains . . . a constitutional unit" herein means that one or more constitutional units are contained in a compound. It is preferable that such a constitutional unit is contained as a repeat unit in a tetralin ring-containing polyester oligomer.

The tetralin ring-containing polyester oligomer refers to one having a weight average molecular weight (Mw) of $6.0\times10^2$ to $1.5\times10^4$. The weight average molecular weight of the tetralin ring-containing polyester oligomer is preferably $7.5\times10^2$ to $1.2\times10^4$, more preferably $1.0\times10^3$ to $1.0\times10^4$ and further preferably $1.3\times10^3$ to $8.0\times10^3$. Similarly, the number average molecular weight (Mn) of the tetralin ring-containing polyester oligomer is preferably $5.0\times10^2$ to $1.0\times10^4$, more preferably $6.0\times10^2$ to $9.0\times10^3$ and further preferably $1.0\times10^3$ to $6.0\times10^3$. If the weight average molecular weight and the number average molecular weight of the tetralin ring-containing polyester oligomer fall within the preferable ranges, the amount of oxygen absorbed can be increased while maintaining heat resistance. A method for controlling the molecular weight of a tetralin ring-containing polyester oligomer to fall within the aforementioned range is not particularly limited; however, for example, a controlling method by use of a terminal stopping agent (described later) and a controlling method by controlling the ratio (G/A) of glycol (G) and an acid (A), are mentioned. Note that the molecular weights herein each refer to a polystyrene equivalent value. Note that, in the present embodiment, the weight average molecular weight and the number average molecular weight can be determined by the method described in the Examples (described later).

The tetralin ring-containing polyester oligomers mentioned above can be used alone or in combination with two or more.

In the constitutional units represented by the above general formulas (1) to (4), examples of the monovalent substituent represented by R include, but not particularly limited to, a halogen atom (for example, a chlorine atom, a bromine atom, an iodine atom), an alkyl group (a linear, branched or cyclic alkyl group having preferably 1 to 15 carbon atoms and more preferably 1 to 6 carbon atoms, such as a methyl group, an ethyl group, a n-propyl group, an isopropyl group, a t-butyl group, a n-octyl group, a 2-ethylhexyl group, a cyclopropyl group, and a cyclopentyl group), an alkenyl group (a linear, branched or cyclic alkenyl group having preferably 2 to 10 carbon atoms and more preferably 2 to 6 carbon atoms, such as a vinyl group and an allyl group), an alkynyl group (an alkynyl group having preferably 2 to 10 carbon atoms and more preferably 2 to 6 carbon atoms, such as an ethynyl group and a propargyl group), an aryl group (an aryl group having preferably 6 to 16 carbon atoms and more preferably 6 to 10 carbon atoms, such as a phenyl group and a naphthyl group), a heterocyclic group (a monovalent group obtained by removing a single hydrogen atom from a 5-member or 6-member aromatic or non-aromatic heterocyclic compound having preferably 1 to 12 carbon atoms and more preferable 2 to 6 carbon atoms, such as a 1-pyrazolyl group, a 1-imidazolyl group and a 2-furyl group), a cyano group, a hydroxy group, a carboxyl group, an ester group, an amido group, a nitro group, an alkoxy group (linear, branched or cyclic alkoxy group having preferably 1 to 10 carbon atoms and more preferably 1 to 6 carbon atoms, such as a methoxy group and an ethoxy group), an aryloxy group (an aryloxy group having preferably 6 to 12 carbon atoms and more preferably 6 to 8 carbon atoms, such as a phenoxy group), an acyl group (including a formyl group. An alkyl carbonyl group having preferably 2 to 10 carbon atoms and more preferably 2 to 6 carbon atoms, and an arylcarbonyl group having preferably 7 to 12 carbon atoms and more preferably 7 to 9 carbon atoms, such as an acetyl group, a pivaloyl group and a benzoyl group), an amino group (an alkylamino group having preferably 1 to 10 carbon atoms and more preferably 1 to 6 carbon atoms, an anilino group having preferably 6 to 12 carbon atoms and more preferably 6 to 8 carbon atoms, a heterocyclic amino group having preferably 1 to 12 carbon atoms and more preferably 2 to 6 carbon atoms, such as an amino group, a methylamino group and an anilino group), a mercapto group, an alkylthio group (an alkylthio group having preferably 1 to 10 carbon atoms and more preferably 1 to 6 carbon atoms, such as a methylthio group and an ethylthio group), an arylthio group (an arylthio group having preferably 6 to 12 carbon atoms and more preferably 6 to 8 carbon atoms, such as a phenylthio group), a heterocyclic thio group (a heterocyclic thio group having preferably 2 to 10 carbon atoms and more preferably 1 to 6 carbon atoms, such as a 2-benzothiazolylthio group), an imido group (an imido group having preferably 2 to 10 carbon atoms and more preferably 4 to 8 carbon atoms, such as a N-succinimido group and a N-phthalimido group).

Note that when the above monovalent substituent R has a hydrogen atom, the hydrogen atom may be further substituted with a substituent T (herein, substituent T is the same as defined in the above monovalent substituent R). Specific examples thereof include, but not particularly limited to, an alkyl group substituted with a hydroxy group (for example, a hydroxyethyl group), an alkyl group substituted with an alkoxy group (for example, a methoxyethyl group), an alkyl group substituted with an aryl group (for example, a benzyl group), an alkyl group substituted with a primary or secondary amino group (for example, an aminoethyl group), an aryl group substituted with an alkyl group (for example, a p-tolyl group) and an aryloxy group substituted with an alkyl group (for example, a 2-methylphenoxy group). Note that when the monovalent substituent R has a monovalent substituent T, the number of carbon atoms of the substituent T is not included in the number of carbon atoms mentioned above. For example, a benzyl group is regarded as an alkyl group having a single carbon atom substituted with a phenyl group and not regarded as an alkyl group having 7 carbon atoms substituted with a phenyl group. Furthermore, when the above monovalent substituent R has a substituent T, the substituent T may be plural.

In the constitutional units represented by the above general formulas (1) to (4), X represents a divalent group containing at least one group selected from the group consisting of an aromatic hydrocarbon group, a saturated or unsaturated alicyclic hydrocarbon group, a linear or branched and saturated or unsaturated aliphatic hydrocarbon group and a heterocyclic group. The aromatic hydrocarbon group, saturated or unsaturated alicyclic hydrocarbon group, linear or branched and saturated or unsaturated aliphatic hydrocarbon group and heterocyclic group may be substituted or unsubstituted. X may contain a hetero atom or an ether group, a sulfide group, a carbonyl group, a hydroxy group, an amino group, a sulfoxide group or a sulfone group. Herein, examples of the aromatic hydrocarbon group include, but not particularly limited to, an o-phenylene group, a m-phenylene group, a p-phenylene group, a methylphenylene group, an o-xylylene group, a m-xylylene group, a p-xylylene group, a naphthylene group, an anthracenylene group, a phenanthrylene group, a biphenylene group and a fluonylene group. Examples of the alicyclic hydrocarbon group include, but not particularly limited to, cycloalkenylene groups such as a cyclopentylene group, a cyclohexylene group, a methylcyclohexylene group, a cycloheptylene group and a cyclooctylene group; and cycloalkenylene groups such as a cyclohexycenylene group. Examples of the aliphatic hydrocarbon group include, but not particularly limited to, linear or branched alkylene groups such as a methylene group, an ethylene group, a trimethylene group, a propylene group, an isopropylidene group, a tetramethylene group, an isobutylidene group, a sec-butylidene group, a pentamethylene group, a hexamethylene group, a heptamethylene group, an octamethylene group, a nonamethylene group and a dacamethylene group; and alkenylene groups such as a vinylene group, a propenylene group, a 1-butenylene group, a 2-butenylene group, a 1,3-butadienylene group, a 1-pentenylene group, a 2-pentenylene group, a 1-hexenylene group, a 2-hexenylene group and a 3-hexenylene group. These may further have a substituent. Specific examples thereof include, but not particularly limited to, a halogen, an alkoxy group, a hydroxy group, a carboxyl group, a carboalkoxy group, an amino group, an acyl group, a thio group (for example, an alkylthio group, a phenylthio group, a tolylthio group and a pyridylthio group), an amino group (for example, an unsubstituted amino group, a methylamino group, a dimethylamino group and a phenylamino group), a cyano group and a nitro group.

The tetralin ring-containing polyester oligomer having the constitutional unit represented by the above general formula (1) can be obtained by polycondensation of a dicarboxylic acid having a tetralin ring or a derivative (I) thereof and a diol or a derivative (II) thereof.

The dicarboxylic acid having a tetralin ring or a derivative thereof (I) is not particularly limited; for example, a compound represented by the following formula (8) may be mentioned. The dicarboxylic acids having a tetralin ring or derivatives (I) thereof can be used alone or in combination with two or more.

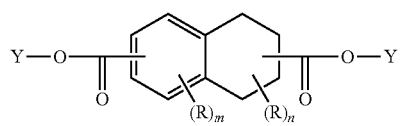

(8)

where R each independently represent a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a mercapto group, an alkylthio group, an arylthio group, an heterocyclic thio group and an imido group, and which may further have a substituent; where m represents an integer of 0 to 3; n represents an integer of 0 to 6, and at least one hydrogen atom is bound to the benzyl position of the tetralin ring; and Y each independently represent a hydrogen atom or an alkyl group.

A compound represented by the above general formula (8) can be obtained by reacting, for example, a dicarboxylic acid having a naphthalene ring represented by the following general formula (9) or a derivative thereof with hydrogen.

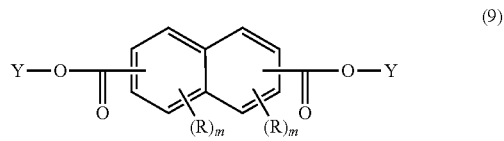

(9)

where R each independently represent a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a mercapto group, an alkylthio group, an arylthio group, an heterocyclic thio group and an imido group, and which may further have a substituent; where m each independently represent an integer of 0 to 3; where Y each independently represent a hydrogen atom or an alkyl group.

Examples of the diol or a derivative (II) thereof include, but not particularly limited to, ethylene glycol, diethylene glycol, triethylene glycol, polyethylene glycol, propylene glycol, dipropylene glycol, polypropylene glycol, 1,3-propanediol, 2-methyl-1,3-propanediol, 1,3-butanediol, 1,4-butanediol, 1,5-pentanediol, 1,6-hexanediol, 1,7-heptanediol, 1,8-octanediol, 1,9-nonandiol, neopentyl glycol, 1,4-cyclohexanedimethanol, 2-phenylpropanediol, 2-(4-hydroxyphenyl)ethyl alcohol, α,α-dihydroxy-1,3-diisopropylbenzene, α,α-dihydroxy-1,4-diisopropylbenzene, o-xylene glycol, m-xylene glycol, p-xylene glycol, hydroquinone, 4,4-dihydroxyphenyl and naphthalene diol or derivatives of these. Diols or derivatives (II) thereof can be used alone or in combination with two or more.

A tetralin ring-containing polyester oligomer containing a constitutional unit represented by the above general formula (2) can be obtained, for example, by polycondensation of a diol having a tetralin ring or a derivative (III) thereof and a dicarboxylic acid or a derivative (IV) thereof.

Examples of the diol having a tetralin ring or a derivative (III) thereof include compounds represented by the following general formula (10). The diol having a tetralin ring or derivatives (III) thereof can be used alone or in combination with two or more.

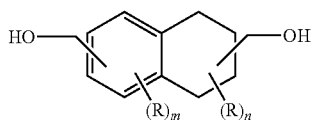
(10)

where R each independently represent a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a mercapto group, an alkylthio group, an arylthio group, a heterocyclic thio group and an imido group, which may further have a substituent; m represents an integer of 0 to 3; n represents an integer of 0 to 6, and at least one hydrogen atom is bound to the benzyl position of the tetralin ring.

A compound represented by the above general formula (10) can be obtained by reacting, for example, a diol having a naphthalene ring represented by the following general formula (11) or a derivative thereof with hydrogen.

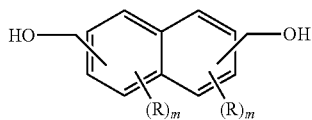
(11)

where R each independently represent a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a mercapto group, an alkylthio group, an arylthio group, a heterocyclic thio group and an imido group, and which may further have a substituent; where m each independently represent an integer of 0 to 3.

Examples of the dicarboxylic acid or a derivative (IV) thereof include, but not particularly limited to, benzene dicarboxylic acids such as oxalic acid, malonic acid, succinic acid, glutaric acid, adipic acid, pimelic acid, suberic acid, azelaic acid, sebacic acid, undecane diacid, dodecane diacid, 3,3-dimethylpentane diacid, phthalic acid, isophthalic acid and terephthalic acid, and naphthalene dicarboxylic acids such as 2,6-naphthalene dicarboxylic acid, anthracene dicarboxylic acid, phenyl malonic acid, phenylene diacetic acid, phenylene dibutyric acid, 4,4-diphenyletherdicarboxylic acid and p-phenylene dicarboxylic acid or derivatives of these. Dicarboxylic acids or derivatives (IV) thereof can be used alone or in combination with two or more.

The tetralin ring-containing polyester oligomer containing a constitutional unit represented by the above general formula (3) or (4) can be obtained by polycondensation of, for example, a hydroxy carboxylic acid having a tetralin ring or a derivative (V) thereof.

Examples of the hydroxycarboxylic acid having a tetralin ring or a derivative (V) thereof include compounds represented by the following general formula (12) or (13). The hydroxycarboxylic acids having a tetralin ring or derivatives (V) thereof can be used alone or in combination with two or more.

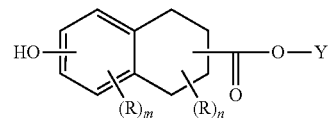
(12)

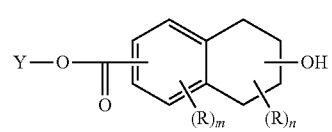
(13)

where R each independently represent a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a mercapto group, an alkylthio group, an arylthio group, a heterocyclic thio group and an imido group, and which may further have a substituent; where m represents an integer of 0 to 3; n represents an integer of 0 to 6, and at least one hydrogen atom is bound to the benzyl position of the tetralin ring; where Y each independently represent a hydrogen atom or an alkyl group.

A tetralin ring-containing polyester oligomer containing a constitutional unit represented by the above general formula (1) or (2) can be also obtained, for example, by a hydrogenation reaction of a polyester oligomer containing a constitutional unit represented by the following general formula (14) or (15).

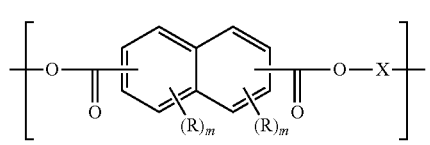
(14)

where R each independently represent a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a mercapto group, an alkylthio group, an arylthio group, a heterocyclic thio group and an imido group, and which may further have a substituent; where m each independently represent an integer of 0 to 3; where X represents a divalent group containing at least one group selected from the group consisting of an aromatic hydrocarbon group, a saturated or unsaturated alicyclic hydrocarbon group, a linear or branched and saturated or unsaturated aliphatic hydrocarbon group and a heterocyclic group.

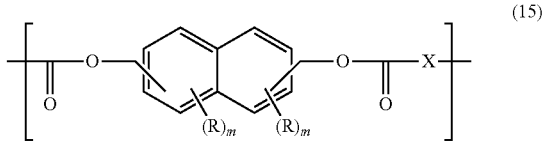

(15)

where R each independently represent a monovalent substituent, which is at least one selected from the group consisting of a halogen atom, an alkyl group, an alkenyl group, an alkynyl group, an aryl group, a heterocyclic group, a cyano group, a hydroxy group, a carboxyl group, an ester group, an amido group, a nitro group, an alkoxy group, an aryloxy group, an acyl group, an amino group, a mercapto group, an alkylthio group, an arylthio group, a heterocyclic thio group and an imido group, and which may further have a substituent; where m each independently represent an integer of 0 to 3; where X represents a divalent group containing at least one group selected from the group consisting of an aromatic hydrocarbon group, a saturated or unsaturated alicyclic hydrocarbon group, a linear or branched and saturated or unsaturated aliphatic hydrocarbon group and a heterocyclic group.

In the compounds represented by the above formulas (8) to (13) and constitutional units represented by the above formulas (14) and (15), specific examples of a monovalent substituent represented by R, specific examples of a divalent group represented by X and specific examples of an alkyl group mentioned as an example of Y are the same as defined in constitutional units represented by the above formulas (1) to (4). Thus, repetition of explanation is avoided herein.

The tetralin ring-containing polyester oligomer to be used in the oxygen absorbent composition of the present embodiment may contain another constitutional unit having a tetralin ring other than the constitutional units represented by the above general formulas (1) to (4) and/or a constitutional unit having no tetralin ring as a copolymerization component(s). Specifically, the compounds mentioned above as a diol or a derivative (II) thereof and a dicarboxylic acid or a derivative (IV) thereof can be used as the copolymerization component(s).

Other copolymerization components are not particularly limited; however, for example, at least one polyfunctional compound of a polyvalent alcohol of a trivalence or more, a polyvalent carboxylic acid of a trivalence or more and a derivative thereof and a hydroxy carboxylic acid of a trivalence or more and a derivative thereof may be mentioned. These polyfunctional compounds can be used alone or in combination with two or more.

The content rate of such a copolymerization component is not particularly limited as long as the effects of the present embodiment are not excessively damaged. For example, the content thereof based on the tetralin ring-containing polyester oligomer (100 mol %) is preferably 0.001 to 3 mol %, more preferably 0.003 to 1 mol % and further preferably 0.005 to 0.5 mol %.

Specific examples of the polyvalent alcohols of a trivalence or more include, but not particularly limited to, glycerin, trimethylolethane, trimethylol propane, pentaerythritol, 1,2,4-butanetriol, 1,2,5-pentanetriol, 1,2,6-hexanetriol and sorbitol.

Specific examples of the polyvalent carboxylic acid of a trivalence or more and a derivative thereof include, but not particularly limited to, propanetricarboxylic acid, trimellitic acid, trimellitic acid anhydride, pyromellitic acid, pyromellitic acid anhydride, benzophenonetetra carboxylic acid anhydride, cyclopentatetracarboxylic acid anhydride and trimellitic acid trimethyl ester. The polyvalent carboxylic acids of a trivalence or more or derivatives thereof can be used alone or in combination with two or more.

Specific examples of the hydroxy carboxylic acid of a trivalence or more and a derivative thereof include, but not particularly limited to, malic acid, hydroxyglutaric acid, hydroxymethyl glutaric acid, tartaric acid, citric acid, hydroxyisophthalic acid and hydroxyterephthalic acid. The hydroxy carboxylic acids of a trivalence or more can be used alone or in combination with two or more.

As more preferable compounds among the tetralin ring-containing polyester oligomers containing a constitutional unit represented by the above general formula (1), for example, tetralin ring-containing polyester oligomers containing constitutional units represented by the above formulas (5) to (7) and tetralin ring-containing polyester oligomers containing constitutional units represented by the following formulas (16) to (18) are mentioned. In the cases where the tetralin ring-containing polyester oligomers contain constitutional units represented by the above formulas (5) to (7) and constitutional units represented by the following formulas (16) to (18), raw material cost tends to be successfully reduced.

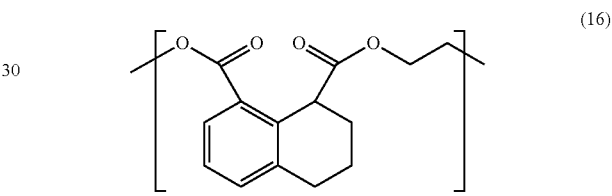

(16)

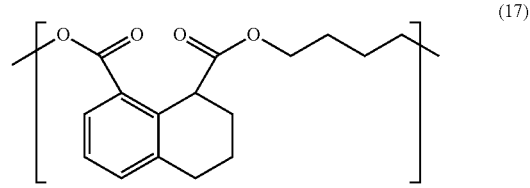

(17)

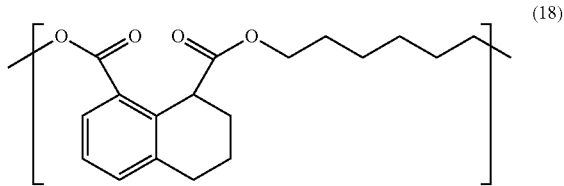

(18)

A method for producing a tetralin ring-containing polyester oligomer as mentioned above is not particularly limited and any one of methods for producing a polyester oligomer conventionally known can be applied. As the method for producing a polyester oligomer, a melt polymerization method such as a transesterification method, a direct esterification method, a solution polymerization method or the like is mentioned. Of them, a transesterification method or a direct esterification method is preferable since raw materials are easily obtained.

In producing a tetralin ring-containing polyester oligomer, a catalyst such as a transesterification catalyst, an esterification catalyst and a polycondensation catalyst, a stabilizer such as an etherification inhibitor, a heat stabilizer and a photo stabilizer, and a polymerization moderator, etc. can be used as long as they are conventionally known. The types and use amounts of these may be appropriately selected depending upon the reaction rate, the molecular weight of a tetralin ring-containing polyester oligomer, viscosity, color tone, safety, heat stability, weather resistance, elution properties themselves, etc. and are not particularly limited. Examples of the catalyst as mentioned above include, but not particularly limited to, for example, compounds of metals such as zinc, lead, cerium, cadmium, manganese, cobalt, lithium, sodium, potassium, calcium, nickel, magnesium, vanadium, aluminum, titanium, antimony and tin (for example, a fatty acid salt, a carbonate, a phosphate, a hydroxide, a chloride, an oxide, and an alkoxide) and magnesium metal. These can be used alone or in combination with two or more.

The above tetralin ring-containing polyester oligomers all are compounds that have hydrogen at the benzyl position of a tetralin ring. Since the hydrogen at the benzyl position is removed by using a tetralin ring-containing polyester compound in combination with a transition metal catalyst as mentioned above, more excellent oxygen absorptivity is exhibited.

The oxygen absorbent composition of the present embodiment can be suppressed in odor generation after absorption of oxygen. The reason is not elucidated; however, for example, the following oxidation reaction mechanism is presumable. In the tetralin ring-containing polyester oligomer as mentioned above, first hydrogen at the benzyl position of a tetralin ring is removed to produce a radical. The radical then reacts with oxygen to oxidize carbon at the benzyl position. In this manner, a hydroxy group or a ketone group is considered to be produced. In other words, in the oxygen absorbent composition of the present embodiment, a molecular chain of an oxygen-absorbing base compound is not cut by an oxidation reaction as is in the prior art; the structure of a tetralin ring-containing polyester oligomer is maintained, and a low molecular weight organic compound serving as a cause of odor is rarely produced after absorption of oxygen, with the result that generation of odor after oxygen absorption is presumably suppressed to the extent that odor cannot be detected from the outside.

<Terminal Stopping Agent>

The molecular weight of a tetralin ring-containing polyester oligomer can be controlled, for example, by reacting a terminal stopping agent with the oligomer. The terminal stopping agent is added during the aforementioned production process of the tetralin ring-containing polyester oligomer to stop the terminal of the polyester oligomer.

The terminal stopping agent to be reacted with a tetralin ring-containing polyester oligomer is not particularly limited; however, for example, a monovalent aliphatic alcohol or a monovalent aliphatic organic acid may be mentioned. These may be used alone or in combination with two or more.

Specific examples of the monovalent aliphatic alcohol include, but not particularly limited to, methanol, ethanol, 1-propanol, 2-propanol, 1-butanol, 2-butanol, isobutyl alcohol, tertiary butyl alcohol, amyl alcohol, hexanol, isohexanol, heptanol, 2-heptanol, octanol, isooctanol, 2-ethylhexanol, nonanol, isononanol, decanol, isodecanol, undecanol, isoundecanol, dodecanol, benzyl alcohol, 2-butyloctanol, 2-butyldecanol, 2-hexyloctanol, 2-hexyldecanol, stearyl alcohol, 2-octyldecanol, 2-hexyldodecanol, 2-octyldodecanol, 2-decyltetradecanol, tridecyl alcohol and isotridecyl alcohol. These can be used alone or in combination with two or more.

Specific examples of the monovalent aliphatic organic acid include, but not particularly limited to, formic acid, acetic acid, propionic acid, butyric acid, isobutyric acid, valeric acid, caproic acid, caprylic acid, 2-ethylhexanoic acid, pelargonic acid, capric acid, neo-decanoic acid, undecanoic acid, lauric acid, tridecanoic acid, myristic acid, pentadecanoic acid, palmitic acid, margaric acid, stearic acid and coconut oil fatty acid. These can be used alone or in combination with two or more.

<Transition Metal Catalyst>

As the transition metal catalyst to be used in the oxygen absorbent composition of the present embodiment, any catalyst known in the art can be appropriately selected and used as long as it can serve as a catalyst for the oxidation reaction of a tetralin ring-containing polyester oligomer as mentioned above. The transition metal catalyst is not particularly limited.

Specific examples of such a transition metal catalyst include, but not particularly limited to, for example, organic acid salts, halides, phosphates, phosphites, hypophosphites, nitrates, sulfates, oxides and hydroxides of transition metals. Examples of the transition metal to be contained in the transition metal catalyst include, but not limited to, titanium, vanadium, chromium, manganese, iron, cobalt, nickel, copper, zinc, ruthenium and rhodium. Of them, manganese, iron, cobalt, nickel and copper are preferable. Examples of the organic acids include, but not limited to, acetic acid, propionic acid, octanoic acid, lauric acid, stearic acid, acetylacetone, dimethyldithiocarbamic acid, palmitic acid, 2-ethylhexanoic acid, neodecanoic acid, linoleic acid, tall acid, oleic acid, capric acid and naphthenic acid. The transition metal catalyst is preferably a combination of a transition metal as mentioned above and an organic acid, and more preferably a combination of a transition metal such as manganese, iron, cobalt, nickel or copper and an organic acid such as acetic acid, stearic acid, 2-ethylhexanoic acid, oleic acid or naphthenic acid. Note that transition metal catalysts can be used alone or in combination with two or more.

In the oxygen absorbent composition of the present embodiment, the content ratio of a tetralin ring-containing polyester oligomer and a transition metal catalyst can be appropriately set depending upon the types and desired performances of the tetralin ring-containing polyester oligomer and the transition metal catalyst and is not particularly limited. In view of the amount of oxygen absorbed of oxygen absorbent composition, the content of a transition metal catalyst is preferably 0.001 to 10 parts by mass in terms of transition metal based on 100 parts by mass of a tetralin ring-containing polyester oligomer, and more preferably 0.002 to 2 parts by mass, and further preferably 0.005 to 1 part by mass.

The oxygen absorbent composition of the present embodiment herein may further contain a carrier substance, if necessary. The oxygen absorbent composition containing a carrier substance, which is a mixture of a tetralin ring-containing polyester oligomer, a transition metal catalyst and a carrier substance, can be directly used as an oxygen absorbent. Alternatively, a tetralin ring-containing polyester oligomer is carried by a carrier substance, if necessary, together with a transition metal catalyst, or a carrier substance is impregnated with a tetralin ring-containing polyester oligomer, if necessary, together with a transition metal catalyst. In this manner, a carrier in which the tetralin ring-containing polyester oligomer is carried by a carrier substance, or a carrier in which a carrier substance is impregnated with the tetralin ring-containing polyester oligomer (hereinafter referred to also as "oxygen absorbent carrier") can be formed. The carrier can be also used as an oxygen absorbent. As described above, if a tetralin ring-containing polyester oligomer is carried by a carrier substance or a carrier substance is impregnated with a tetralin ring-containing polyester oligomer, the contact area of the oxygen absorbent composition of the present embodiment with oxygen can be increased and oxygen-absorbing rate or amount of oxygen absorbed can be increased. Furthermore, handling thereof can be simplified.

The carrier substance can be appropriately selected from carrier substances known in the art and put in use. Specific examples thereof include, but not particularly limited to, powders of synthetic calcium silicate, calcium hydroxide, active carbon, zeolite, perlite, diatomaceous earth, activated soil, silica, kaolin, talc, bentonite, activated alumina, gypsum, silica alumina, calcium silicate, magnesium oxide, black lead, carbon black, aluminium hydroxide and iron oxide. Of these, synthetic calcium silicate, diatomaceous earth, silica and active carbon are preferably used. Note that carrier substances may be used alone or in combination with two or more.

The content of the carrier substance to be added can be appropriately set depending upon the types and desired performances of the tetralin ring-containing polyester oligomer, thermoplastic resin and transition metal catalyst to be used and is not particularly limited; however, the content thereof based on a tetralin ring-containing polyester oligomer (100 parts by mass) is preferably 10 to 1000 parts by mass and more preferably 20 to 800 parts by mass.

Note that a tetralin ring-containing polyester oligomer can be carried on a carrier substance in accordance with a conventional method. The method for this is not particularly limited. For example, a solution mixture containing a tetralin ring-containing polyester oligomer or a solution mixture containing this compound and a transition metal catalyst is prepared. A carrier substance is coated with the solution mixture or soaked in the solution mixture to obtain an oxygen absorbent carrier having the carrier substance loaded (or impregnated) with the tetralin ring-containing polyester oligomer (and if necessary, a transition metal catalyst). Note that when the solution mixture is prepared, a solvent can be further contained. If a tetralin ring-containing polyester oligomer and a transition metal catalyst are solid substances, these can be efficiently carried on a carrier substance if a solvent is used. The solvent to be used herein can be appropriately selected from those known in the art in consideration of the solubilities of a tetralin ring-containing polyester oligomer and a transition metal catalyst and is not particularly limited. For example, organic solvents such as methanol, 2-propanol, ethylene glycol, toluene, xylene, methyl acetate, ethyl acetate, butyl acetate, diisopropyl ether, tetrahydrofuran, methyl ethyl ketone, dichloromethane and chloroform are preferable; and methanol, 2-propanol, ethyl acetate and methyl ethyl ketone are more preferable. Note that solvents may be used alone or in combination with two or more.

<Thermoplastic Resin>

The oxygen absorbent composition of the present embodiment, if necessary, may further contain a thermoplastic resin (hereinafter, this composition will be referred to also as an "oxygen-absorbing resin composition"). At this time, the state of a tetralin ring-containing polyester oligomer and a transition metal catalyst contained in an oxygen absorbent composition is not particularly limited. For example, a tetralin ring-containing polyester oligomer and a transition metal catalyst may be contained in a thermoplastic resin as they are or contained in a thermoplastic resin in such a state where a tetralin ring-containing polyester oligomer and a transition metal catalyst are carried on the aforementioned carrier substance.

The above oxygen absorbent composition can be prepared in accordance with a conventional method; the preparation method is not particularly limited. For example, an oxygen absorbent composition can be obtained by mixing or kneading a tetralin ring-containing polyester oligomer, a transition metal catalyst and a carrier substance to be blended if necessary, with a thermoplastic resin.

As the above thermoplastic resin, those known in the art can be appropriately used. Examples thereof include, but not particularly limited to, polyolefins such as random or block copolymers of α-olefins such as a low-density polyethylene, a medium-density polyethylene, a high-density polyethylene, a linear and low-density polyethylene, a linear and extremely low-density polyethylene, a polypropylene, poly-1-butene, poly-4-methyl-1-pentene or ethylene, propylene, 1-butene, and 4-methyl-1-pentene; acid-modified polyolefins such as maleic anhydride-grafted polyethylene and maleic anhydride-grafted polypropylene; ethylene-vinyl compound copolymers such as an ethylene-vinyl acetate copolymer, an ethylene-vinyl alcohol copolymer, an ethylene-vinyl chloride copolymer, an ethylene-(meth)acrylate copolymer, an ion crosslinked product (ionomer) thereof and an ethylene-methyl methacrylate copolymer; styrene resins such as polystyrene, an acrylonitrile-styrene copolymer and an α-methylstyrene-styrene copolymer; polyvinyl compounds such as poly(methyl acrylate) and poly(methyl methacrylate); polyamides such as nylon 6, nylon 66, nylon 610, nylon 12, poly(metaxylylene adipamide) (MXD6); polyesters such as poly(ethylene terephthalate) (PET), poly(butylene terephthalate) (PBT), poly(trimethylene terephthalate) (PTT), poly(ethylene naphthalate) (PEN), glycol-modified poly(ethylene terephthalate) (PETG), poly(ethylene succinate) (PES), poly(butylene succinate) (PBS), polylactate, polyglycolate, polycaprolactone and polyhydroxyalkanoate; polycarbonates; and polyethers such as polyethylene oxide or mixtures of these. Note that thermoplastic resins can be used alone or in combination with two or more.

Of these, at least one selected from the group consisting of a polyolefin, a polyester, a polyamide, an ethylene-vinyl alcohol copolymer, a plant-derived resin and chlorine resin is preferable as the thermoplastic resin. Furthermore, at least one selected from the group consisting of a polyolefin, a polyester, a polyamide, an ethylene-vinyl alcohol copolymer and a chlorine resin is preferable.

When the oxygen absorbent composition of the present embodiment contains a thermoplastic resin, the content of a thermoplastic resin to be added based on the tetralin ring-containing polyester oligomer (100 parts by mass) is preferably 1 to 10,000 parts by mass, in view of oxygen-absorbing performance, and the moldability and appearance of a resin molded article, more preferably 20 to 5,000 parts by mass, further preferably 50 to 3,000 parts by mass and particularly preferably 100 to 2,000 parts by mass.

<Additives>

The oxygen absorbent composition of the present embodiment herein may contain additives known in the art other than the aforementioned components, as long as the effect of the present embodiment is not excessively damaged. Examples of such optional components include, but not particularly limited to, additives such as a drying agent, a pigment such as titanium oxide, a dye, an antioxidant, a slipping agent, an antistatic agent and a stabilizer; fillers such as calcium carbonate, clay, mica and silica; and a deodorant. The ratio of such additives is not particularly limited; however, for example, the ratio is preferably 0.001 to 50 mass %, more preferably 0.005 to 30 mass % and further more preferably, 0.01 to 20 mass %.

The oxygen absorbent composition of the present embodiment may further contain a radical generator and a photo initiator, if necessary, in order to facilitate an oxygen absorption reaction. Specific examples of the radical generator include various types of N-hydroxy imide compounds. Examples thereof include, but not particularly limited to, N-hydroxysuccinimide, N-hydroxymaleimide, N,N'-dihydroxycyclohexanetetracarboxydiimide, N-hydroxyphthalimide, N-hydroxytetrachlorophthalimide, N-hydroxytetrabromophthalimide, N-hydroxyhexahydrophthalimide, 3-sulfonyl-N-hydroxyphthalimide, 3-methoxycarbonyl-N-hydroxyphthalimide, 3-methyl-N-hydroxyphthalimide, 3-hydroxy-N-hydroxyphthalimide, 4-nitro-N-hydroxyphthalimide, 4-chloro-N-hydroxyphthalimide, 4-methoxy-N-hydroxyphthalimide, 4-dimethylamino-N-hydroxyphthalimide, 4-carboxy-N-hydroxyhexahydrophthalimide, 4-methyl-N-hydroxyhexahydrophthalimide, N-hydroxyhetimide, N-hydroxyhimimide, N-hydroxytrimellitimide and N,N-dihydroxypyromellitdiimide. Examples of the photo initiator include, but not particularly limited to, benzophenone and a derivative thereof, a thiazine dye, a metal porphyrin derivative and an anthraquinone derivative. Note that these radical generators and photo initiators can be used alone or in combination with two or more. The ratio of such a radical generator and a photo initiator is not particularly limited; however, for example, the ratio is preferably, 0.001 to 10 mass %, more preferably, 0.005 to 5 mass % and more preferably 0.01 to 2 mass %.

<Usage>

To the oxygen absorbent composition of the present embodiment, a known granulation method or a known molding method such as an extrusion molding can be applied. The composition is molded into, for example, powdery, granular, pellet, film or sheet-forms or other small-piece forms. The oxygen absorbent molded article thus obtained can be used directly as an oxygen absorbent. Alternatively, if the obtained oxygen absorbent molded article is packed in an air-permeable packaging material, the molded article can also be used as an oxygen absorbent packaging body.

It is preferable that a pellet-form oxygen absorbent molded article herein is further ground into powdery grains when used in order to increase the contact area with oxygen to thereby effectively deliver oxygen-absorbing performance.

Note that as the air-permeable packaging material, which is not particularly limited, a known packaging material having air permeability can be applied. In view of sufficiently exerting the oxygen absorption effect, an air-permeable packaging material having high air permeability is preferred. Specific examples of the air-permeable packaging material include, but not particularly limited to, highly air-permeable packaging materials used in various usages, including paper sheets such as Japanese paper, machine-made paper and rayon paper; non-woven clothes using various types of fibers obtained from pulp, cellulose and a synthetic resin; a plastic film or a porous plastic film; or a microporous film obtained by adding calcium carbonate etc., followed by drawing it; and a laminate obtained by stacking two types or more selected from these. As the plastic film, laminate films, each formed by laminating and attaching a film of e.g., a polyethylene terephthalate, a polyamide, a polypropylene or a polycarbonate film and a film serving as a sealing film and formed of a polyethylene, an ionomer, a polybutadiene, an ethylene acrylate copolymer, an ethylene methacrylate copolymer or an ethylene vinyl acetate copolymer, can be used.

(Usage of Oxygen-Absorbing Resin Composition)

The oxygen-absorbing resin composition of the present embodiment is molded into film-form or sheet form and used in the form of e.g., label, card and packing. Note that a film is distinguished from a sheet by thickness, more specifically, the film has a thickness of 0.1 to 500 µm; whereas a sheet has a thickness of more than 500 µm.

Note that if the oxygen-absorbing resin composition of the present embodiment is molded into a film form or a sheet form and put in use, micro voids may be formed in the film or the sheet, for example, by drawing. Owing to this operation, the oxygen permeability of the film or sheet to be molded can be enhanced, with the result that the oxygen-absorbing performance of the tetralin ring-containing polyester oligomer mentioned above tends to be extremely effectively delivered.

The oxygen-absorbing resin composition molded into a film form or a sheet form can be not only used as a packaging material or a packaging container in the form of a single-layer form but also used in combination with another substrate in the form of a laminate. Typical examples of such a laminate include, but not particularly limited to, for example, a laminate formed by stacking at least one layer containing an oxygen-absorbing resin composition according to the present embodiment and at least one layer selected from the group consisting of another resin layer, a paper substrate layer and a metal foil layer. The laminate can be used as an oxygen absorbing multilayer packaging material or an oxygen absorbing multilayer packaging container. Note that generally, the oxygen-absorbing resin composition layer molded into a film form or a sheet form is preferably provided to an interior side rather than the outer surface of a container etc. so as not to be exposed at the outer surface of the container etc. In view of avoiding direct contact with the content of a container, the oxygen-absorbing resin composition layer molded into a film form or a sheet form is preferably provided outer than the inner surface of the container etc. Likewise, in using the oxygen-absorbing resin composition layer in a multilayer laminate, it is preferable that the composition is molded into a film form or a sheet form and arranged as at least one intermediate layer.

As one preferable aspect of the laminate mentioned above, an oxygen-absorbing multilayer laminate having at least three layers, i.e., a sealant layer containing a thermoplastic resin such as a polyolefin resin, a layer containing the oxygen-absorbing resin composition of the present embodiment (oxygen-absorbing layer) and a gas barrier layer containing a gas barrier substance, in this order is mentioned. The oxygen-absorbing multilayer can be further used as an oxygen-absorbing paper container by further laminating a paper base material as the outer layer of the gas barrier layer. The phrase "having at least three layers in this order" means that the sealant layer, oxygen-absorbing layer and gas barrier layer are arranged in this order; and is a concept including not only an aspect where a sealant layer, an oxygen-absorbing layer and a gas barrier layer are directly stacked (hereinafter, expressed as a "sealant layer/oxygen-absorbing layer/gas barrier layer") but also an aspect where one or more other layers such as a resin layer, a metal foil layer or an adhesive layer are interposed between a sealant layer and an oxygen-absorbing layer or between an oxygen-absorbing layer and a gas barrier layer (hereinafter, referred to as an "intermediate layer") (for example, "sealant layer/resin layer/oxygen-absorbing layer/adhesion layer/gas barrier layer", and "sealant layer/resin layer/adhesion layer/oxygen-absorbing layer/adhesion layer/resin layer/adhesion layer/ gas barrier layer/adhesion layer/support") (the same applied hereinafter without an exception).

The thermoplastic resins that can be used in the sealant layer are the same as exemplified in the other thermoplastic resins described in the oxygen-absorbing resin composition of the present embodiment. It is preferable that the thermoplastic resin to be used in the sealant layer can be appropriately selected in consideration of compatibility with other layers (oxygen-absorbing layer, gas barrier layer, resin layer, adhesive layer, support, etc.) in adjacent to the sealant layer.

The gas barrier substance to be used as a gas barrier layer is not particularly limited; however, for example, a gas barrier thermoplastic resin, a gas barrier thermosetting resin, a vapor deposition film formed of silica, alumina, aluminum, or the like and metal foil such as aluminum foil can be used. Examples of the gas barrier thermoplastic resin include, but not particularly limited to, an ethylene-vinyl alcohol copolymer, MXD6 and poly(vinylidene chloride). Examples of the gas barrier thermosetting resin include, but not particularly limited to, a gas barrier epoxy resin, for example, "MAXIVE" manufactured by Mitsubishi Gas Chemical Company, Inc.

Note that, in consideration of processability of the oxygen-absorbing multilayer laminate as mentioned above in manufacturing, it is preferably to interpose an intermediate layer containing a thermoplastic resin such as a polyolefin resin between a gas barrier layer containing a gas barrier substance and an oxygen-absorbing layer containing the oxygen-absorbing resin composition of the present embodiment. It is preferable that the thickness of the intermediate layer is substantially the same as the thickness of the sealant layer, in view of processability. Herein in consideration of variation by processing, the phrase "substantially the same" means that the ratio of thickness values falls within ±10%.

In the above oxygen-absorbing multilayer laminate, the thickness of the oxygen-absorbing layer, which is not particularly limited, is preferably 5 to 100 µm and more preferably 10 to 50 µm. If the thickness of the oxygen-absorbing layer falls within the preferable range, oxygen-absorbing performance tends to be more improved without excessively damaging processability and economic aspect, compared to an oxygen-absorbing layer having a thickness outside the range.

In contrast, in the above oxygen-absorbing multilayer laminate, the thickness of the sealant layer, which is not particularly limited, is preferably 2 to 50 µm and more preferably 5 to 30 µm. If the thickness of the sealant layer falls within the preferable range, the oxygen-absorbing rate of the oxygen-absorbing layer tends to be more enhanced without excessively damaging processability and economic aspect, compared to a sealant layer having a thickness outside the range. Note that in consideration of processability in molding the oxygen-absorbing resin composition of the present embodiment into a film-form or a sheet-form, the thickness ratio of the sealant layer and the oxygen-absorbing layer (the sealant layer: the oxygen-absorbing layer) is preferably 1:0.5 to 1:3 and more preferably 1:1 to 1:2.5.

In the above oxygen-absorbing multilayer laminate, the thickness of the gas barrier layer, which may be appropriately specified depending upon the type of gas barrier substance to be used and gas barrier performance required, is not particularly limited. In view of processability and economic aspect, the thickness of the gas barrier layer in the above oxygen-absorbing multilayer laminate is preferably 1 to 100 µm and more preferably 2 to 80 µm.

Note that the above oxygen-absorbing multilayer laminate, if a paper substrate is stacked on the gas barrier layer as the outer layer, can be used as an oxygen-absorbing paper container. In this case, in view of moldability into a paper container, the thickness of the layers inside the gas barrier layer is preferably 100 µm or less, more preferably 80 µm or less, and further preferably 60 µm or less, for example, 50 µm or less.

As a method for manufacturing an oxygen-absorbing multilayer laminate as mentioned above, which is not particularly limited, known methods such as a coextrusion method, a laminating method and a coating method can be applied depending upon e.g., the properties of the material, purpose of processing and processing step. For example, a film or a sheet can be formed by a manufacturing method of extruding a molten resin composition through e.g., a T die and a circular die by an extruder attached therewith or by a method of applying an adhesive to an oxygen-absorbing film or a sheet and adhering it to another film or sheet. Also, if molten resins are simultaneously injected or sequentially injected through multi-layered multiple dies into an injection mold by use of an injector, a multilayer container or a preform for manufacturing a container having a predetermined shape can be formed. The preform is heated to a drawing temperature and stretched in the axial direction and simultaneously stretched in the circumferential direction in accordance with stretch blow-molding by hydrostatic pressure to obtain a bottle.

For example, a film-form oxygen-absorbing multilayer laminate can be further processed into a bag-form or a cover material. For example, a sheet-form oxygen-absorbing multilayer laminate is thermoformed into an oxygen-absorbing multilayer container of a predetermined shape such as a tray, a cup, a bottle and a tube by a molding method such as vacuum molding, air-pressure forming and plug assist molding. The bag-form container, if it is filled with stuff such as food and an open hole is provided, can be preferably used as a pouch for microwave cooking provided with a hole for easily releasing water vapor during microwave cooking.

<Irradiation of Energy Beam>

In using the oxygen absorbent composition, the oxygen-absorbing resin composition of the present embodiment and various types of moldings such as laminates using the composition, initiation of an oxygen absorption reaction can be facilitated and an oxygen-absorbing rate can be increased by irradiation of an energy beam. Examples of the usable energy beam include visible ray, UV ray, X-ray, electron ray and y ray. The amount of irradiation energy can be appropriately selected depending upon the type of energy line to be used.

<Preserve>

The oxygen absorbent composition, the oxygen-absorbing resin composition of the present embodiment and various types of moldings such as laminates and containers using the composition do not require a moisture content for absorbing oxygen. In other words, oxygen can be absorbed regardless of the presence or absence of the moisture content of a preserve. Thus, the composition and moldings can be used in a wide variety of uses no matter which type of preserve is contained. In particular, odor generation is suppressed after absorption of oxygen, the composition and moldings can be particularly preferably used in e.g., foods, cooking foods, beverages, health foods and medicinal products. More specifically, since the oxygen absorbent composition, the oxygen-absorbing resin composition of the present embodiment and various types of moldings such as laminates using the composition are excellent in oxygen-absorbing performance in a wide range of humidity conditions from low humidity to high humidity (relative humidity 0% to 100%) and excellent in taste and flavor retention property of a content, they are suitable for packaging various articles. In addition, unlike a conventional oxygen absorbent composition using iron powder, content of iron powder is not essential in the oxygen absorbent composition of the present embodiment. Thus, the oxygen absorbent composition containing no iron powder does not respond to a metal detector and can be suitably used for a preserve (for example, alcohol beverages and carbonate beverages) which cannot be stored because of the presence of iron.

Specific examples of the preserve include, but not particularly limited to, beverages such as cow milk, juice, coffee, tea and alcohol beverage; liquid seasonings such as source, soy sauce, noodle broth and dressing; cooking foods such as soup, stew and curry; paste foods such as jam and mayonnaise; seafood products such as tuna and fish and shellfish; processed milk products or processed egg products such as cheese, butter and egg; processed livestock products such as meat, salami sausage, sausage and ham; vegetables such as carrot, potato, asparagus and shiitake mushroom; fruits; egg; noodles; rices such as rice and polished rice; cereals such as beans; processed rice foods or processed cereal foods such as steamed rice, festive red rice, rice cake and rice gruel; confectionaries such as adzuki-bean jelly, pudding, cake and steamed bean-jam buns; dry foods (food having a low water activity) such as powdered seasoning, powdered coffee, coffee bean, tea, powdered milk for infants, cooking food for infants, powdered dietary food, nursing care cooking food, dry vegetable, Japanese cracker and rice cracker; chemical products such as an adhesive, a gluing agent, an agrichemical and a pesticide; medicinal products; health foods such as a vitamin supplement; pet foods;

sundry articles such as a cosmetic, a shampoo, a conditioner and a detergent; and other various articles. Particularly, the oxygen-absorbing resin composition of the present embodiment is suitable for packaging materials for a preserve easily degrading in the presence of oxygen. Examples of such a preserve include beverages such as beer, wine, fruit juice beverage, fruit juice, vegetable juice, carbonate soft drink and tea; foods such as fruit, nut, vegetable, meat products, infant food, coffee, jam, mayonnaise, ketchup, edible oil, dressing, source, food boiled in soy sauce and milk products; and others such as medicinal products and cosmetics.

Note that the term "water activity" refers to a scale showing the content of free water in an article and represented by a numeral from 0 to 1. The article containing no water is represented by 0 and pure water is represented by 1. More specifically, the water activity Aw of an article is defined as follows:

$Aw = P/P_0 = RH/100$ where P represents a water vapor pressure of a space where an article is sealed and the state of the space reaches equivalent, $P_0$ represents the water vapor pressure of pure water and RH (%) represents the relative humidity of the space.

Before and after filling (packaging) of a preserve, the container and the preserve can be sterilized by a method suitable for the preserve. Examples of the sterilization method include heat treatment such as a boiling treatment performed at 100° C. or less, a semi-retort treatment and a retort treat performed at 100° C. or more, and a high retort treatment performed at 130° C. or more; sterilization with an electromagnetic wave such as UV rays, microwave and gamma ray; gas treatment performed with ethylene oxide etc.; and sterilization with a chemical agent such as hydrogen peroxide and hypochlorite.

EXAMPLES

The present invention will be more specifically described by use of Examples and Comparative Examples, below; however, the present invention is not limited by these. Unless otherwise specified, nuclear magnetic resonance (NMR) measurement was performed at room temperature. In Examples and Comparative Examples, physical property values were obtained by the following measurement methods and measurement apparatuses.

(Method for Determining Weight Average Molecular Weight and Number Average Molecular Weight)

The weight average molecular weight and the number average molecular weight were measured by Gel Permeation Chromatography-low-angle laser light scattering GPC-LALLS. As a measurement apparatus, "HLC-8320GPC" manufactured by Tosoh Corporation was used.

(Measurement Method for Temperature at which Weight Reduction Rate Becomes 3%)

Using a differential thermal/thermogravimetric concurrent measurement apparatus, the temperature, at which a weight reduction rate of the polyester oligomer obtained became 3%, was measured at a measurement initiation temperature: 20° C., a temperature raising rate of 10° C./min and a target temperature: 500° C. As the measurement apparatus, "DTG-60" manufactured by Shimadzu Corporation was used.

Synthesis Example of Monomer

Synthesis Example 1 Dimethyl tetralin-2,6-dicarboxylate

To an autoclave of 18 L (inner volume), dimethyl naphthalene-2,6-dicarboxylate (2.20 kg), 2-propanol (11.0 kg) and a catalyst (350 g containing 50 wt % of water) of 5 wt % palladium immobilized on active carbon were supplied. Subsequently, the air within the autoclave was replaced with nitrogen and the nitrogen was further replaced with hydrogen. Thereafter, hydrogen was supplied in the autoclave until the interior pressure of the autoclave reached 0.8 MPa. Next, a stirrer installed in the autoclave was driven and a rotation speed of the stirrer was adjusted to be 500 rpm. After the interior temperature was increased up to 100° C. over 30 minutes while stirring the mixture in the autoclave, hydrogen was further supplied in the autoclave to set a pressure in the autoclave at 1 MPa. After that, hydrogen was continuously supplied in the autoclave in accordance with a reduction of pressure with the progression of a reaction so as to maintain 1 MPa. Seven hours later, since pressure reduction in the autoclave was stopped, the autoclave was cooled and unreacted residual hydrogen was released, and then the reaction solution was taken out from the autoclave. After the reaction solution was filtered and the catalyst was removed, 2-propanol was distilled away from the separated filtrate by an evaporator to obtain a crude product. To the crude product obtained, 2-propanol (4.40 kg) was added. Dimethyl tetralin-2,6-dicarboxylate was purified by recrystallization in a yield of 80%. Note that NMR analysis results are as follows.

1H-NMR (400 MHz CDCl$_3$) δ7.76-7.96 (2H m), 7.15 (1H d), 3.89 (3H s), 3.70 (3H s), 2.70-3.09 (5H m), 2.20-2.25 (1H m), 1.80-1.95 (1H m).

Synthesis Example 2 Tetralin-1,8-dicarboxylic acid anhydride

To an autoclave of 18 L (inner volume), 1,8-naphthalic acid anhydride (1.80 kg), a catalyst (dry product, 300 g) of 5 wt % palladium immobilized on active carbon and ethyl acetate (7.50 kg) were supplied. The air within the autoclave was replaced twice with nitrogen (1 MPa) and then further replaced twice with hydrogen (1 MPa). Thereafter, the pressure of the autoclave was decreased to normal pressure and thereafter the interior temperature was increased to 80° C. The pressure was increased by hydrogen to 5 MPa and a reaction was carried out by stirring a mixture in the autoclave at 500 rpm at the same temperature and pressure for two hours. After completion of the reaction, the interior of the autoclave was cooled to room temperature, and hydrogen was released from the autoclave. The atmosphere of the autoclave was substituted twice with nitrogen (1 MPa). Thereafter, the catalyst was separated by filtration from the mixture in the autoclave and washed three times with acetone (1.0 kg) to obtain a mother liquor. The solvent was removed from the obtained mother liquor by an evaporator under reduced pressure to obtain a crude product. The obtained crude product was recrystallized to obtain tetralin-1,8-dicarboxylic acid anhydride in a yield of 80%. Note that NMR analysis results were as follows. 1H-NMR (400 MHz CDCl$_3$) δ7.98 (1H d), 7.47 (1H d), 7.38 (1H dd), 3.93 (1H t), 2.80-3.00 (2H m), 2.55-2.64 (1H m), 2.14-2.24 (1H m), 1.77-1.94 (2H m).

Synthesis Example 3 Dimethyl tetralin-1,8-dicarboxylate

To a four-neck separable flask of 5 L (inner volume), tetralin-1,8-dicarboxylic acid anhydride (300 g) and methanol (3.00 kg) were supplied. To the obtained mixture, concentrated sulfuric acid (150 g) was gradually added while stirring. The inner temperature of the flask was increased to 65° C. under a nitrogen atmosphere and a dehydro-condensation reaction was performed by heating methanol to reflux. After confirming that the reaction proceeded up to 99% or more by 1H-NMR, methanol (1.50 g) was distilled away to concentrate the reaction solution. Subsequently, the reaction solution was neutralized with a saturated aqueous sodium hydrogen carbonate solution and then subjected to suction filtration to obtain a crude product. The crude product obtained was recrystallized with 2-propanol to obtain dimethyl tetralin-1,8-dicarboxylate in a yield of 90%. Note that analysis results of NMR were as follows. 1H-NMR (400 MHz CDCl$_3$) δ7.79 (1H d), 7.30 (1H d), 7.24 (1H t), 4.47 (1H t), 3.84 (3H s), 3.69 (3H s), 2.79-2.93 (2H m), 2.24-2.28 (1H m), 1.92-1.99 (1H m), 1.75-1.83 (2H m).

Production Example of Polyester Oligomer

Production Example 1

To a polyester resin manufacturing apparatus equipped with a rectifier of a packed tower system, a partial condenser, a total condenser, a cold trap, a stirrer, a heating unit and a nitrogen inlet tube, dimethyl tetralin-2,6-dicarboxylate (453 g) obtained in Synthesis Example 1, 1,4-butanediol (115 g), 1-octanol (95 g) and tetrabutyl titanate (0.040 g) were supplied. The temperature of the mixture in the apparatus was raised up to 220° C. under a nitrogen atmosphere to perform a transesterification reaction. After the reaction conversion rate of the dicarboxylic acid component was allowed to reach 85% or more, the pressure was gradually reduced to 400 Pa (3 Torr) while the temperature was kept at 220° C. to distill away low boiling-point compounds outside the system. In this manner, tetralin ring-containing polyester oligomer A (hereinafter, referred to also as "polyester oligomer A") was obtained.

The weight average molecular weight and the number average molecular weight of polyester oligomer A obtained were determined by the above method. As a result, the polystyrene-equivalent weight average molecular weight thereof was 2.8×10$^3$ and the number average molecular weight thereof was 2.3×10$^3$. The weight reduction rate of polyester oligomer A was measured by the above method. As a result, the temperature at which weight was reduced by 3% was 296° C.

Production Example 2

Tetralin ring-containing polyester oligomer B (hereinafter, referred to also as "polyester oligomer B") was synthesized in the same manner as in Production Example 1 except that 1,6-hexanediol (137 g) was used in place of 1,4-butanediol. The weight average molecular weight of polyester oligomer B was 3.3×10$^3$ and the number average molecular weight thereof was 2.7×10$^3$. The temperature at which weight was reduced by 3% was 301° C.

Production Example 3

To the polyester resin manufacturing apparatus used in Production Example 1, dimethyl tetralin-1,8-dicarboxylate (453 g) obtained in Synthesis Example 3, 1,4-butanediol (131 g), 1-octanol (95 g) and tetrabutyl titanate (0.040 g) were supplied. The mixture in the apparatus was raised to 220° C. under a nitrogen atmosphere to perform a transesterification reaction. After the reaction conversion rate of the dicarboxylic acid component reached 85% or more, the pressure was gradually reduced to 400 Pa (3 Torr) while the temperature was maintained at 220° C. to distill away low boiling point substances out of the system. In this manner, tetralin ring-containing polyester oligomer C (hereinafter, referred to also as "polyester oligomer C") was obtained. The polystyrene-equivalent weight average molecular weight of polyester oligomer C was 2.9×10$^3$, the number average molecular weight thereof was 2.4×10$^3$ and the temperature at which weight was reduced by 3% was 271° C.

Production Example 4

A tetralin ring-containing polyester oligomer D (hereinafter, referred to also as "polyester oligomer D") was synthesized in the same manner as in Production Example 3 except that 1,6-hexanediol (156 g) was used in place of 1,4-butanediol. The weight average molecular weight of polyester oligomer D was 3.6×10$^3$ and the number average molecular weight thereof was 2.6×10$^3$. The temperature at which weight was reduced by 3% was 272° C.

Example 1

To polyester oligomer A (100 parts by mass), silica sol (trade name "MEK-ST 40D" manufactured by Nissan Chemical Industries, Ltd., and containing 60 mass % of methyl ethyl ketone) (750 parts by mass) and cobalt 2-ethylhexanoate were added such that the amount of cobalt was 0.4 parts by mass to obtain a mixture. The obtained mixture was stirred at 65° C. for one hour under a nitrogen atmosphere. Thereafter, methyl ethyl ketone was distilled away from the mixture under reduced pressure and the obtained solid substance was pulverized to prepare a granular product (composition).

Next, two gas barrier bags formed of an aluminum foil laminate film were prepared. Then, the gas barrier bags were separately filled with 2 g of the obtained granular product together with 500 cc of air. The relative humidity in one of the gas barrier bag was adjusted to be 100%; whereas the relative humidity of the other gas barrier bag was adjusted to be 30% and then the gas barrier bags were separately sealed airtight to obtain sealed bags. The sealed bags thus obtained were stored at 23° C. for a month. The total amount of oxygen absorbed (hereinafter, referred to also as "amount of oxygen absorbed") during this period was measured. The amount of oxygen absorbed was measured by an oximeter (trade name: LC-750F, manufactured by Toray Industries, INC.).

Example 2

A granular product (composition) was manufactured in the same manner as in Example 1 except that polyester oligomer B was used in place of polyester oligomer A. The amount of oxygen absorbed was measured and sensory evaluation of odor before and after storage was performed. The results of these are shown in Table 1.

Example 3

A granular product (composition) was manufactured in the same manner as in Example 1 except that polyester oligomer C was used in place of polyester oligomer A. The amount of oxygen absorbed was measured and sensory evaluation of odor before and after storage was performed. The results of these are shown in Table 1.

Example 4

A granular product (composition) was manufactured in the same manner as in Example 1 except that polyester oligomer D was used in place of polyester oligomer A. The amount of oxygen absorbed was measured and sensory evaluation of odor before and after storage was performed. The results of these are shown in Table 1.

TABLE 1

| | Tetralin-ring containing polyester oligomer (parts by mass based on 100 parts by mass) | | | | | Amount of oxygen absorbed[1] (cc/g per agent) | | Amount of oxygen absorbed[2] (cc/g per compound) | | |
|---|---|---|---|---|---|---|---|---|---|---|
| | Tetralin-ring containing polyester oligomer | Carrier material | Transition metal catalyst | | | | | | | |
| | | | Type | Molecular amount of metal (parts by mass) | Carrier material | 100% humidity | 30% humidity | 100% humidity | 30% humidity | Odor |
| Example 1 | Polyester oligomer A | Silica | Cobalt 2-ethylhexanoate | 0.4 | 300 | 23 | 24 | 92 | 95 | ◎ |
| Example 2 | Polyester oligomer B | Silica | Cobalt 2-ethylhexanoate | 0.4 | 300 | 24 | 25 | 96 | 99 | ◎ |
| Example 3 | Polyester oligomer C | Silica | Cobalt 2-ethylhexanoate | 0.4 | 300 | 23 | 24 | 93 | 95 | ◎ |
| Example 4 | Polyester oligomer D | Silica | Cobalt 2-ethylhexanoate | 0.4 | 300 | 25 | 24 | 98 | 97 | ◎ |

[1]Total amount of oxygen (per oxygen absorbent (g)) absorbed under storage at a temperature of 23° C. for a month after initiation of test
[2]Total amount of oxygen (per tetralin-ring containing polyester oligomer (g)) absorbed under storage at a temperature of 23° C. for a month after initiation of test Sensory evaluation of odor before and after storage was made by five testers based on the following evaluation criteria.

(Sensory Evaluation Criteria)

2 points: Composition itself has no odor and the composition before and after storage has no odor.

1 point: Composition itself slightly has odor; however odor does not change before and after storage.

0 point: Odor increased after storage.

Based on the above sensory evaluation results, odor was evaluated based on the following criteria. These measurement results are shown in Table 1.

(Odor Evaluation Criteria)

◎: Average value of sensory evaluation results of five testers round off to the first decimal place is 2 points ○: Average value of sensory evaluation results of five testers round off to the first decimal place is 1 point x: Average value of sensory evaluation results of five testers round off to the first decimal place is 0

Example 5

To polyethylene terephthalate (trade name: Unipet BK-2180, manufactured by Japan Unipet) (90 parts by mass), polyester oligomer A (10 parts by mass) was added. With the mixture (100 parts by mass), cobalt stearate (II) was mixed so as to obtain a cobalt equivalent of 0.05 parts by mass. The mixture was melt-kneaded at 270° C. to prepare an oxygen-absorbing resin composition. Subsequently, the obtained oxygen-absorbing resin composition was heated and pressed under reduced pressure to prepare a single layer film having a thickness of 100 μm.

The oxygen-absorbing performance of the single layer film was evaluated by the following procedure. First, the single layer film was cut into pieces having 100 cm² in size and used as film samples. Then, two three-side sealed bags formed of an aluminum foil laminate film and having a size of 24 cm×20 cm were prepared. The three-side sealed bags were each charged with the obtained film samples together with 500 cc of air. The relative humidity of one of the bag was controlled to be 100%; whereas the relative humidity of the other bag was controlled to be 30%. Thereafter, each of the bags was sealed airtight to obtain sealed bags. The sealed bags thus obtained were stored at 40° C. for a month and thereafter the oxygen concentration within the bags was measured by an oximeter ("LC-750F" manufactured by Toray Engineering Co., Ltd.). Based on the oxygen concentration, the amount of oxygen absorbed of each bag was calculated. Furthermore, based on the following criteria, sensory evaluation of odor before and after storage was made.

Sensory evaluation of odor before and after storage was made by five testers based on the following evaluation criteria.

(Sensory Evaluation Criteria)

2 points: Composition itself has no odor and the composition before and after storage has no odor.

1 point: Composition itself slightly has odor; however odor does not change before and after storage.

Example 8

A single layer film was prepared in the same manner as in Example 5 except that polyester oligomer D was used in place of polyester oligomer A and the amount of oxygen absorbed was measured and the shape of the film was checked, and sensory evaluation of odor before and after storage was made. The results are shown in Table 2.

Comparative Example 1

A single layer film was prepared in the same manner as in Example 5 except that polyester oligomer A was not used. The amount of oxygen absorbed was measured and the shape of the film was checked, and sensory evaluation of odor before and after storage was made. The results are shown in Table 2.

TABLE 2

| | | Tetralin-ring containing polyester oligomer | | Transition metal catalyst | | Amount of oxygen absorbed[1] (cc/g per film) | | | |
|---|---|---|---|---|---|---|---|---|---|
| | Thermoplastic resin | Type | Addition amount (parts by mass) | Type | Molecular amount of metal (parts by mass) | 100% humidity | 30% humidity | Shape[2] | Odor |
| Example 5 | PET | Polyester oligomer A | 10 | Cobalt stearate | 0.05 | 7.8 | 1.3 | ◉ | ◉ |
| Example 6 | | Polyester oligomer B | 10 | Cobalt stearate | 0.05 | 8.1 | 1.5 | ◉ | ◉ |
| Example 7 | | Polyester oligomer C | 10 | Cobalt stearate | 0.05 | 8.3 | 1.4 | ◉ | ◉ |
| Example 8 | | Polyester oligomer D | 10 | Cobalt stearate | 0.05 | 8.6 | 1.6 | ◉ | ◉ |
| Comparative Example 1 | | — | — | Cobalt stearate | 0.05 | 0 | 0 | ◉ | ◉ |

[1] Total amount of oxygen (per film (g)) absorbed under storage at a temperature of 40° C. for a month after initiation of test
[2] ◉ satisfactorily maintained, ○ almost satisfactorily maintained, X shape is unsatisfactory 0 point: Odor increased after storage.

Based on the above sensory evaluation results, odor was evaluated based on the following criteria.

(Odor Evaluation Criteria)

◉: Average value of sensory evaluation results of five testers round off to the first decimal place is 2 points ○: Average value of sensory evaluation results of five testers round off to the first decimal place is 1 point x: Average value of sensory evaluation results of five testers round off to the first decimal place is 0

The sealed bags were stored further for a month and thereafter the shape of the film was checked.

The results of these are shown in Table 2.

Example 6

A single layer film was prepared in the same manner as in Example 5 except that polyester oligomer B was used in place of polyester oligomer A and the amount of oxygen absorbed was measured and the shape of the film was checked, and sensory evaluation of odor before and after storage was made. The results are shown in Table 2.

Example 7

A single layer film was prepared in the same manner as in Example 5 except that polyester oligomer C was used in place of polyester oligomer A and the amount of oxygen absorbed was measured and the shape of the film was checked, and sensory evaluation of odor before and after storage was made. The results are shown in Table 2.

Example 9

To a polyamide ("Novamid X21 F07" manufactured by Mitsubishi Engineering-Plastics Corporation) (95 parts by mass), polyester oligomer A (5 parts by mass) was added. To the mixture (100 parts by mass), cobalt stearate (II) was added so as to obtain a cobalt equivalent of 0.05 parts by mass. The mixture was melt-kneaded at 250° C. to prepare an oxygen-absorbing resin composition. Subsequently, the obtained oxygen-absorbing resin composition was heated and pressed under reduced pressure to prepare a single layer film having a thickness of 100 μm.

The oxygen-absorbing performance of the single layer film was evaluated by the following procedure. First, the single layer film was cut into pieces having 100 cm$^2$ in size and used as film samples. Then, two three-side sealed bags formed of an aluminum foil laminate film and having a size of 24 cm×20 cm were prepared. The three-side sealed bags were each charged with the obtained film samples together with 500 cc of air. The relative humidity of one of the bag was controlled to be 100%; whereas the relative humidity of the other bag was controlled to be 30%. Thereafter, each of the bags was sealed airtight to obtain sealed bags. The sealed bags thus obtained were stored at 40° C. for a month and thereafter the oxygen concentration within the bags was measured by an oximeter ("LC-750F" manufactured by Toray Engineering Co., Ltd.). Based on the oxygen concentration, the amount of oxygen absorbed of each bag was calculated. Furthermore, based on the following criteria, sensory evaluation of odor before and after storage was made.

Sensory evaluation of odor before and after storage was made by five testers based on the following evaluation criteria.
(Sensory Evaluation Criteria)
2 points: Composition itself has no odor and the composition before and after storage has no odor.
1 point: Composition itself slightly has odor; however odor does not change before and after storage.

0 point: Odor increased after storage.
Based on the above sensory evaluation results, odor was evaluated based on the following criteria.
(Odor Evaluation Criteria)
◎: Average value of sensory evaluation results of five testers round off to the first decimal place is 2 points
○: Average value of sensory evaluation results of five testers round off to the first decimal place is 1 point
x: Average value of sensory evaluation results of five testers round off to the first decimal place is 0
The sealed bags were stored further for a month and thereafter the shape of the film was checked.
The results of these are shown in Table 3.

Example 10

A single layer film was prepared in the same manner as in Example 9 except that polyester oligomer B was used in place of polyester oligomer A and the amount of oxygen absorbed was measured and the shape of the film was checked, and sensory evaluation of odor before and after storage was made. The results are shown in Table 3.

Example 11

A single layer film was prepared in the same manner as in Example 9 except that polyester oligomer C was used in place of polyester oligomer A and the amount of oxygen absorbed was measured and the shape of the film was checked, and sensory evaluation of odor before and after storage was made. The results are shown in Table 3.

Example 12

A single layer film was prepared in the same manner as in Example 9 except that polyester oligomer D was used in place of polyester oligomer A and the amount of oxygen absorbed was measured and the shape of the film was checked, and sensory evaluation of odor before and after storage was made. The results are shown in Table 3.

Comparative Example 2

A single layer film was prepared in the same manner as in Example 9 except that polyester oligomer A was not used. The amount of oxygen absorbed was measured and the shape of the film was checked, and sensory evaluation of odor before and after storage was made. The results are shown in Table 3.

TABLE 3

| | | Tetralin-ring containing polyester oligomer | | Transition metal catalyst | | Amount of oxygen absorbed[1] (cc/g per film) | | | |
|---|---|---|---|---|---|---|---|---|---|
| | Thermoplastic resin | Type | Addition amount (parts by mass) | Type | Molecular amount of metal (parts by mass) | 100% humidity | 30% humidity | Shape[2] | Odor |
| Example 9 | Polyamide | Polyester oligomer A | 5 | Cobalt stearate | 0.05 | 3.0 | 1.9 | ◎ | ◎ |
| Example 10 | | Polyester oligomer B | 5 | Cobalt stearate | 0.05 | 3.2 | 2.0 | ◎ | ◎ |
| Example 11 | | Polyester oligomer C | 5 | Cobalt stearate | 0.05 | 6.1 | 1.8 | ◎ | ◎ |
| Example 12 | | Polyester oligomer D | 5 | Cobalt stearate | 0.05 | 6.0 | 1.7 | ◎ | ◎ |
| Comparative Example 2 | | — | — | Cobalt stearate | 0.05 | 0 | 0 | ◎ | ◎ |

[1]Total amount of oxygen (per film (g)) absorbed under storage at a temperature of 40° C. for a month after initiation of test
[2]◎ satisfactorily maintained, ○ almost satisfactorily maintained, X shape is unsatisfactory As is apparent from Tables 1 to 3, it was confirmed that the oxygen absorbent composition of the present invention exhibits satisfactory oxygen-absorbing performance even both high humidity and low humidity environments, has no odor after oxygen absorption and maintains the shape of the film even after oxygen absorption.

As described in the foregoing, the present invention is not limited to the above embodiments and Examples and can be appropriately modified within the gist of the invention.

INDUSTRIAL APPLICABILITY

The oxygen absorbent composition of the present invention and the molded article thereof have excellent oxygen-absorbing performance in a wide variety of humidity conditions from low humidity to high humidity and thus can be widely and efficiently used generally in the technical field in which oxygen absorption is required. Furthermore, since the oxygen absorbent composition of the present invention and the molded article thereof can absorb oxygen regardless of the presence or absence of moisture content in a preserve, and suppress generation of odor after oxygen absorption, they can be particularly effectively used in e.g., foods, cooking foods, beverages, pharmaceutical products and health foods. In addition, since an aspect of the oxygen absorbent composition of the present invention and the molded article thereof not responsive to a metal detector can be realized, they can be widely and effectively used in products, in which a metal and a metal piece are inspected from the outside thereof by a metal detector, for example, in packages and containers.

The invention claimed is:

1. An oxygen absorbent composition at least comprising:
   a polyester oligomer containing a constitutional unit having at least one tetralin ring selected from the group consisting of constitutional units represented by the following formulas (5) and (16),

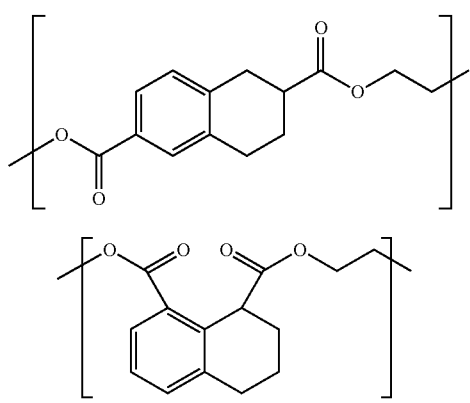

wherein the polyester oligomer has a number average molecular weight of 500 to 6000 and a transition metal catalyst, wherein the transition metal catalyst is a catalyst comprising at least one transition metal selected from the group consisting of manganese, iron, cobalt, nickel and copper, and the transition metal catalyst is contained in an amount of 0.001 to 10 parts by mass in terms of a transition metal based on 100 parts by mass of the polyester oligomer.

2. The oxygen absorbent composition according to claim 1, wherein the polyester oligomer is a polyester oligomer obtained by reacting a terminal stopping agent containing a monovalent aliphatic alcohol or an aliphatic organic acid.

3. The oxygen absorbent composition according to claim 1, further comprising a thermoplastic resin.

4. A molded article containing the oxygen absorbent composition according to claim 3.

* * * * *